United States Patent
Skinner et al.

(10) Patent No.: US 9,755,568 B2
(45) Date of Patent: Sep. 5, 2017

(54) SYSTEM AND METHOD FOR DETECTING LOSS OF INPUT PHASE BY SENSING BEFORE POWER RECTIFIER

(71) Applicant: Nidec Motor Corporation, St. Louis, MO (US)

(72) Inventors: James L. Skinner, Collinsville, IL (US); Prakash B. Shahi, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 14 days.

(21) Appl. No.: 14/327,278

(22) Filed: Jul. 9, 2014

(65) Prior Publication Data

US 2016/0013746 A1    Jan. 14, 2016

(51) Int. Cl.
*H02H 7/122*    (2006.01)
*H02P 29/024*   (2016.01)
*H02P 23/26*    (2016.01)

(52) U.S. Cl.
CPC .......... *H02P 29/0243* (2016.02); *H02P 23/26* (2016.02)

(58) Field of Classification Search
CPC ... H02P 2201/15; H02M 1/42; H02M 1/4208; H02H 3/48
USPC ...................................................... 363/56.01
See application file for complete search history.

(56) References Cited

U.S. PATENT DOCUMENTS

| | | | |
|---|---|---|---|
| 3,243,796 A | 3/1966 | Harmon et al. | |
| 3,480,852 A | 11/1969 | Hung | |
| 3,766,510 A | 10/1973 | Quinn | |
| 4,027,204 A | 5/1977 | Norbeck | |
| 4,379,317 A | 4/1983 | Conroy, Jr. et al. | |
| 4,825,328 A | 4/1989 | Izaguirre, Sr. | |
| 4,843,533 A | 6/1989 | Roof et al. | |
| 4,879,625 A | 11/1989 | Potenzone | |
| 5,563,758 A | 10/1996 | Dembrosky et al. | |
| 5,668,692 A | 9/1997 | Rodgers et al. | |
| 6,541,954 B1 | 4/2003 | Gluszek | |
| 7,400,116 B2* | 7/2008 | Kato | B60L 11/1803 320/166 |
| 7,480,124 B2 | 1/2009 | Pankau et al. | |
| 7,929,323 B2 | 4/2011 | Schmidt | |
| 2004/0095784 A1* | 5/2004 | Zhou | H02M 5/458 363/37 |

(Continued)

FOREIGN PATENT DOCUMENTS

JP     20135641 A     1/2013

*Primary Examiner* — Bickey Dhakal
(74) *Attorney, Agent, or Firm* — Hovey Williams LLP

(57) ABSTRACT

A system for detecting a decrease in or loss of an input phase to a motor. A power rectifier rectifies and combines three input voltages to produce an output voltage to power the motor. A PFC circuit manages the power flowing to the motor. A sensing circuit located between the power rectifier and the PFC senses a voltage level of the power rectifier's output voltage. Alternatively, a sensing rectifier is connected before the power rectifier, and the sensing circuit senses the voltage level of the sensing rectifier's output voltage. A microprocessor compares the sensed voltage level to a threshold voltage level which is indicative of the decrease in or loss of one of the three input voltages, and if the former drops below the latter, then the microprocessor sends a signal to either shut off the motor or cause the PFC circuit to reduce the power flowing to the motor.

17 Claims, 7 Drawing Sheets

(56) References Cited

U.S. PATENT DOCUMENTS

| | | | |
|---|---|---|---|
| 2007/0063668 A1* | 3/2007 | Schnetzka | H02M 5/458 318/812 |
| 2010/0141037 A1* | 6/2010 | Joo | H02M 1/36 307/64 |
| 2012/0313614 A1* | 12/2012 | Ohshita | H02M 3/1584 323/311 |
| 2013/0114306 A1* | 5/2013 | Kooken | H02M 1/10 363/21.01 |
| 2013/0155729 A1 | 6/2013 | Lee | |
| 2013/0182470 A1* | 7/2013 | Chen | H02M 7/537 363/56.01 |
| 2013/0242623 A1* | 9/2013 | Wei | H02M 5/458 363/37 |
| 2014/0028239 A1* | 1/2014 | Hart | H02P 27/06 318/722 |

* cited by examiner

SYSTEM AND METHOD FOR DETECTING LOSS OF INPUT PHASE BY SENSING BEFORE POWER RECTIFIER

FIELD

The present invention relates to systems and methods for controlling the operation of electric motors.

BACKGROUND

In some electric motor systems, alternating current (AC) power comprising three input voltages, each 120 degrees out of phase with the next, is converted by power rectifiers to direct current (DC) power for driving electric motors. Under certain circumstances, such as an electrical short, a phase can be lost. When a phase is lost, the motor can still operate by drawing more current from the remaining phases, but this can overheat the motor's components, especially when operating at full load, and can even overload the transformer. In that light, it is desirable to detect and address the loss of a phase. Prior attempts to detect the loss of a phase include examining the AC input voltages before the power rectifier, with a drop in line voltage potentially indicating the loss of a phase, but this requires multiple isolated or differential circuits. It is also known to examine voltage peaks after the power rectifier, with the absence of an expected peak indicating the loss of a phase, but this requires using a timer to measure the frequency of the voltage peaks.

Power Factor Correction (PFC) circuits are sometimes used to manage power flowing to motors. PFC makes a motor-driven appliance appear to be purely resistive by eliminating any phase difference between the voltage and the current from the power supply, and thereby reduces energy consumption by minimizing inefficient and costly reactive loads, maximizes the available power that can be drawn from the power supply, and minimizes any transient/harmonic effects that can feed back into the electrical system and disrupt the power source to other appliances. Without PFC, an imbalance between input phases, resulting from a decrease in or loss of a phase, results in the current in the reduced/lost phase dropping very low or to zero such that the current drawn by the motor is pulled through the remaining phases. Some systems sense the bus voltage and when input voltage is low and load is high they operate the PFC in a current-limited mode. However, running in this mode for an extended period of time may introduce undue stress on components of the system and adversely affect the reliability and longevity of the system. Importantly, this solution does not sense the loss of a phase in three-phase systems.

This background discussion is intended to provide information related to the present invention which is not necessarily prior art.

SUMMARY

Embodiments of the present invention solve the above-described and other problems and limitations by providing improved detection of and response to a decrease in or loss of an input voltage phase to a three-phase motor so that overloading, overheating, and other harmful effects can be avoided. In one implementation, the present invention accomplishes this with a less complex and less expensive single sensing circuit that does not require isolation or differential sensing.

An electric motor system constructed in accordance with the present invention may broadly comprise an electric motor and a motor control subsystem. In a first embodiment, the motor control subsystem may include a power rectifier operable to receive, rectify, and combine a plurality of spaced-apart sinusoidal input voltage signals (i.e., input phases) to produce an output voltage signal to power the electric motor; a power factor correction circuit electrically connected to the power rectifier so as to receive the output voltage signal and operable to manage power flowing to the motor; a sensing circuit electrically connected between the power rectifier and the power factor correction circuit and operable to sense a voltage level of the output voltage signal; and a microprocessor. The microprocessor may be in communication with the sensing circuit and the power factor correction circuit and operable to receive the sensed voltage level from the sensing circuit, compare the sensed voltage level to a predetermined threshold voltage level, wherein the predetermined threshold voltage level corresponds to at least a decrease in one of the input phases, and if the sensed voltage level is below the predetermined threshold voltage level, send a signal to the power factor correction circuit to at least limit an output power to the electric motor.

In a second embodiment, the motor control subsystem may include the power rectifier operable to receive, rectify, and combine a plurality of spaced-apart sinusoidal input voltage signals (i.e., input phases) to produce a first output voltage signal to power the electric motor; the power factor correction circuit electrically connected to the power rectifier so as to receive the first output voltage signal and operable to manage power flowing to the motor; a sensing rectifier electrically connected in parallel with the power rectifier and operable to receive, rectify, and combine the plurality of spaced-apart sinusoidal input voltage signals to produce a second output voltage signal; and the sensing circuit electrically connected to the sensing rectifier and operable to sense a voltage level of the second output voltage signal; and the microprocessor. The microprocessor may operate substantially the same as in the first embodiment except that it examines the voltage level of the second output voltage signal of the sensing rectifier rather than the voltage level of the first output voltage signal of the power rectifier.

In various implementations of these embodiments, the electric motor control subsystem may further include any one or more of the following additional features. The electric motor may be a multiple- (e.g., three-) phase permanent magnet motor. The power factor correction circuit and the sensing circuit may each use approximately the same reference voltage. The predetermined threshold voltage level may correspond to a loss of one of the input phases. The predetermined voltage level may be adjustable. The signal sent by the microprocessor may cause the electric motor to shut off. The process of comparing the sensed voltage level to the predetermined threshold voltage level may be repeated a predetermined number of times during a predetermined period of time, and the signal to at least limit the power flowing to the motor may only be sent if the sensed voltage level is below the predetermined threshold voltage level for at least the predetermined number of times during the predetermined period of time.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention provides improved detection of and response to a decrease in or loss of an input voltage phase to a three-phase motor so that overloading, overheating, and other harmful effects can be avoided. In one implementation, the present invention accomplishes this with a less complex and less expensive single sensing circuit that does not require isolation or differential sensing.

Figure 1:
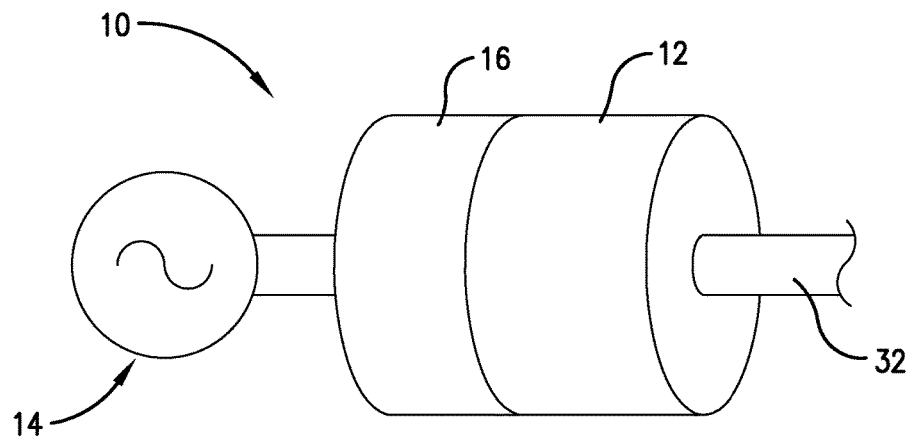
FIG. 1 is a schematic diagram of an electric motor system of the present invention.
Figure 2:
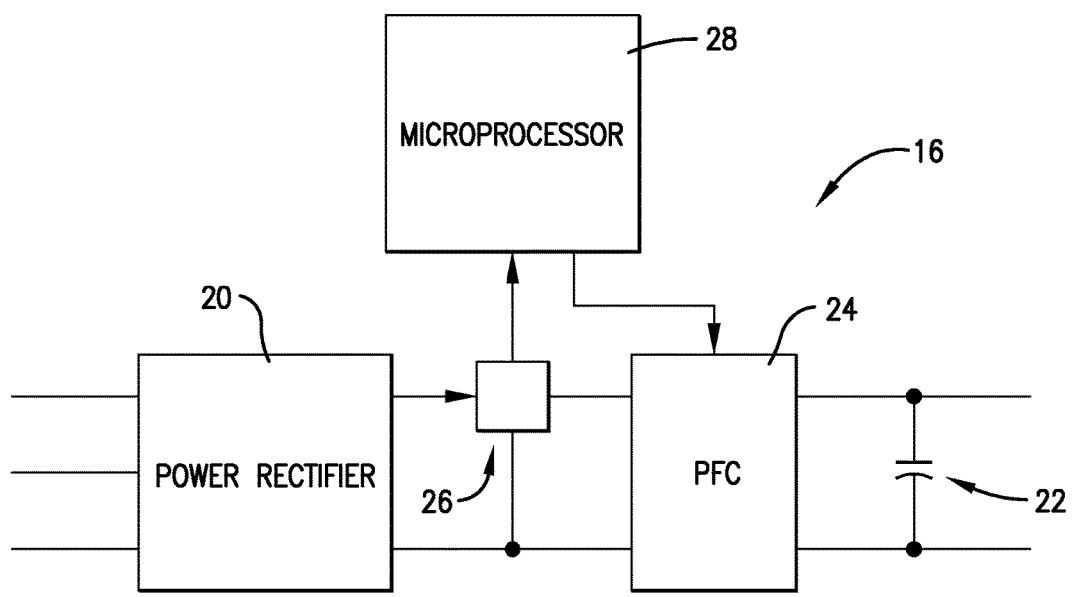
FIG. 2 is a block diagram of a first embodiment of a motor control subsystem of the electric motor system of FIG. 1.

Referring to the figures, an electric motor system 10 constructed in accordance with the present invention is shown. Referring to FIG. 1, the motor system 10 may broadly include an electric motor 12; a power source 14; and a motor control subsystem 16. Referring to FIG. 2, in a first embodiment the motor control subsystem 16 may include a power rectifier 20; a capacitor 22; a PFC circuit 24; a sensing circuit 26; and a microprocessor 28. The motor 12 may be a three-phase permanent magnet motor. For example, the motor 12 may be an approximately 0.5 to 2.5 horsepower three-phase permanent magnet AC inverter motor. The motor 12 may drive any appropriate load. For example, the motor 12 may drive a fan or a pump which may be part of a heating and air-conditioning unit, such as a commercial blower, or an appliance, such as a washing machine or a clothes dryer, which may include additional electrical or mechanical components not described herein. The motor 12 may include a shaft 32 which transmits the driving force to the load. The power source 14 may be a conventional AC power source, such as a standard 208 to 230 Volt or 460 Volt source available in commercial buildings.

Figure 3:
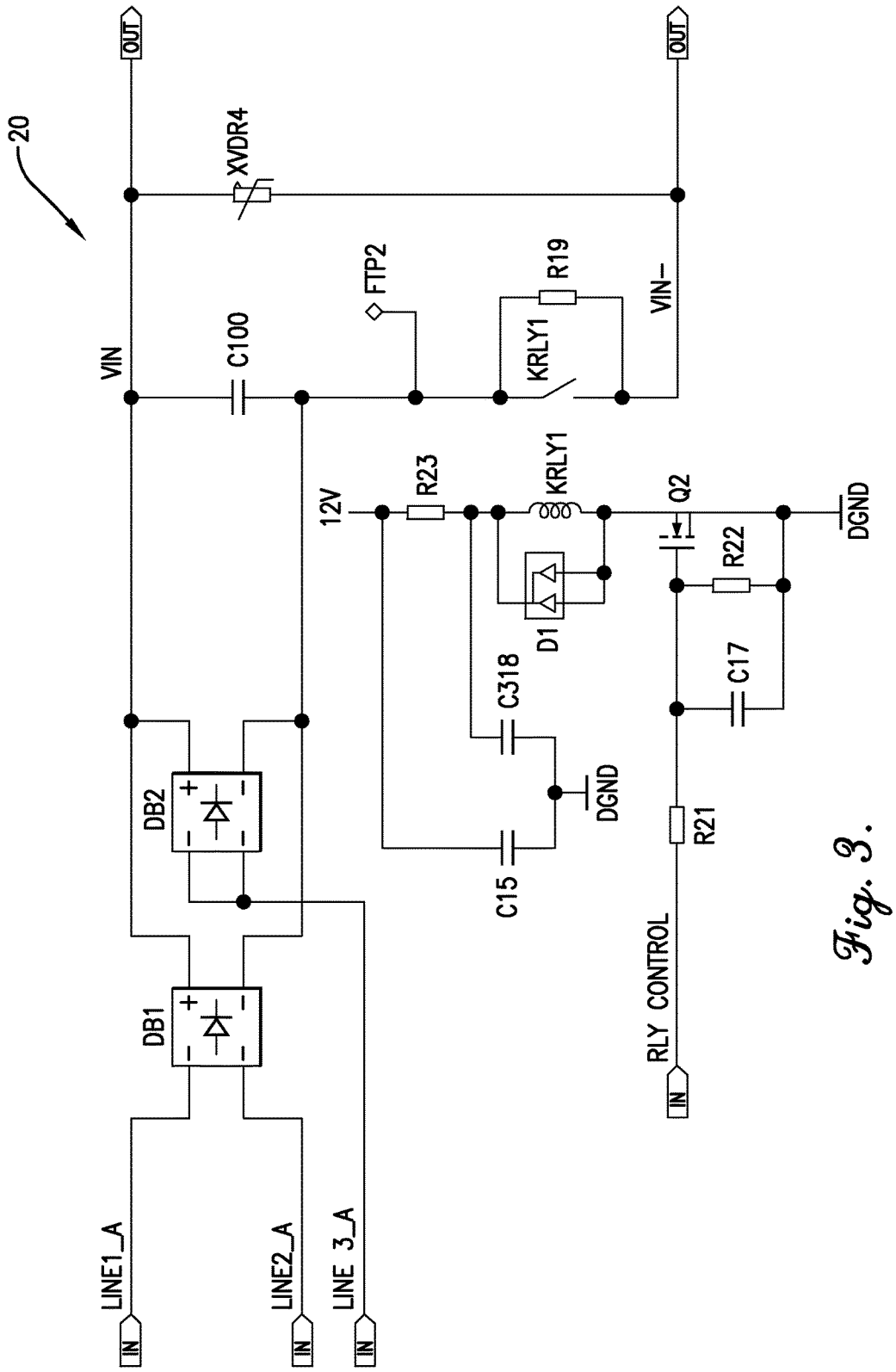
FIG. 3 is a schematic diagram of an implementation of a power rectifier component of the motor control subsystem of FIG. 2.

The power rectifier 20 may be operable to receive three-phase AC power from the power source 14 and convert it to DC power for driving the motor 12. Referring to FIG. 3, one possible, non-limiting implementation of the power rectifier 20 of FIG. 2 is shown in greater detail. Other implementations are possible, and the details of any such implementations of the motor system 10 of the present invention will largely depend on the requirements and functionalities of the system 10 and its various components. The capacitor 22 may be operable to smooth the rectified three-phase voltage signal output by the power rectifier 20. The PFC circuit 24 is located between the power rectifier 20 and the capacitor 22, and may be operable to manage power flowing to the motor 12 by reducing a phase difference between the voltage and the current from the power supply 14 and thereby making the motor 12 appear to be substantially electrically resistive.

Figure 4:
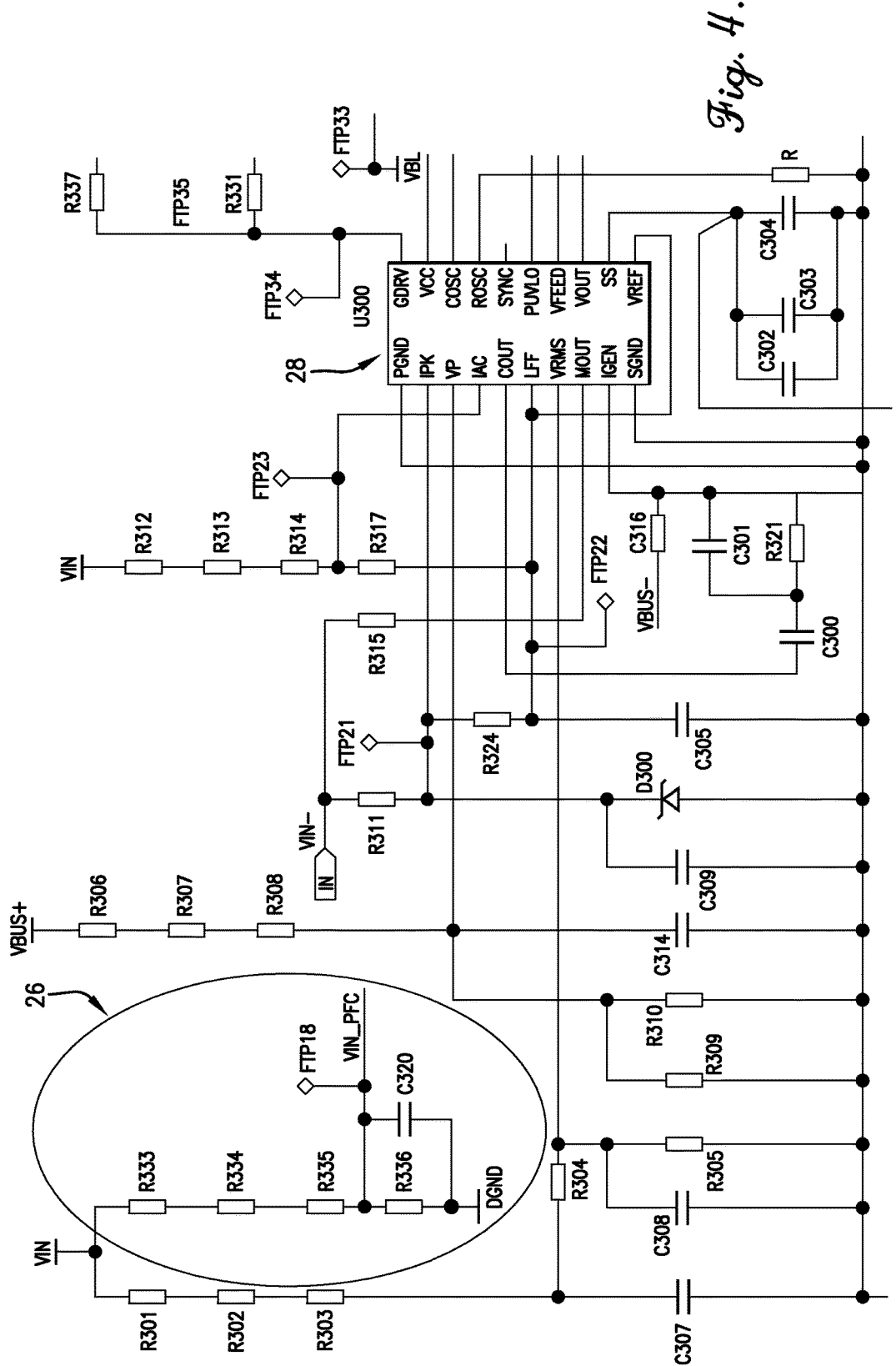
FIG. 4 is a schematic diagram of an implementation of a sensing circuit of the motor control subsystem of FIG. 2.

The sensing circuit 26 is located between the power rectifier 20 and the PFC circuit 24, and may be operable to sense the voltage signal output by the power rectifier 20 and provide input to the microprocessor 28 regarding one or more a characteristics of the voltage signal. In one implementation, other control circuits (in addition to the PFC 24) may be also located after (i.e., on the output side of) the power rectifier 20, such that the sensing circuit 26, the PFC 24, and the other control circuits can use substantially the same reference voltage and therefore the present invention does not require isolation or differential sensing. Referring to FIG. 4, one possible, non-limiting implementation of the sensing circuit 26 of FIG. 2 is shown in greater detail. Other implementations are possible, and the details of any such implementations of the motor system 10 of the present invention will largely depend on the requirements and functionalities of the system 10 and its various components.

The microprocessor 28 may be operable to receive and process signals from other components of the motor system 10, including the sensing circuit 26; generate signals used to control operation of the motor system 10, including signals that control operation of the PFC 24; and execute one or more computer programs, including control software, comprising executable instructions for accomplishing certain signal processing and generation and other functionality. In particular, the microprocessor 28 executes a computer program that receives sensed voltage data from the sensing circuit 26, and uses that data to detect a decrease in or loss of a phase and to respond thereto by generating a control signal that either shuts off the motor 12 or limits the input current and power on the remaining phases by causing the PFC 24 to limit output power to the motor 12.

In operation, the first embodiment may operate as follows. Referring to FIGS. 1, 2, 5, and 6, the power rectifier 20 receives three spaced-apart sinusoidal input voltage signals from the power source 14, rectifies and combines them, and outputs an output voltage signal, as shown in step 100, which, under normal operation, appears as the first portion of the waveform shown in FIG. 5. If one of the three input voltage signals is lost, the output changes to the second portion of the waveform shown in FIG. 5. The sensing circuit 26 senses the power rectifier's output voltage signal and communicates the output voltage level to the microprocessor 28, as shown in step 102.

Figure 5:
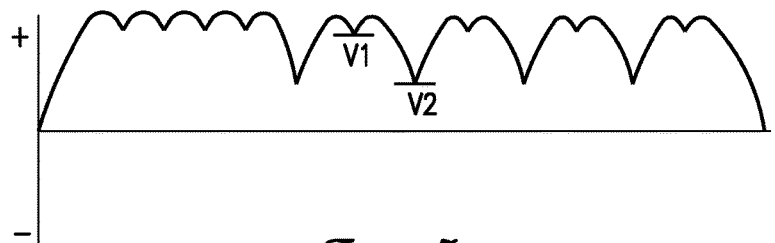
FIG. 5 is a representation of a rectified three-phase output voltage signal illustrating the loss of an input phase.

The computer program running on the microprocessor 28 compares the sensed output voltage level to a predetermined threshold voltage level, as shown in step 104. In one implementation, the predetermined threshold voltage level may be set relatively high in order to detect even a mere decrease in one of the three input voltage signals; in another implementation, the predetermined threshold voltage level may be set relatively low to detect a substantial or complete loss of one of the input voltage signals. In FIG. 5, for example, the predetermined threshold voltage level may be set to a value that is between the trough voltage (V1) associated with the normal output voltage signal and the trough voltage (V2) associated with the output voltage signal when one of the input voltage signals is missing. The predetermined threshold voltage level may be adjustable to accommodate, e.g., different motors and operation conditions. Because the present invention examines the voltage troughs rather than the voltage peaks, it is not frequency dependent so no timer is needed. If the sensed output voltage level is above the predetermined threshold voltage level, then the system 10 continues normal operation, as shown in step 106. However, if the sensed output voltage level drops below the predetermined threshold voltage level, the microprocessor 28 sends a signal either to shut off the motor 12 or to cause the PFC 24 to limit input current and power on the remaining phases by limiting output power to the motor 12 (thereby allowing the motor 12 to continue operating at less than full power), as shown in step 108.

Figure 7:
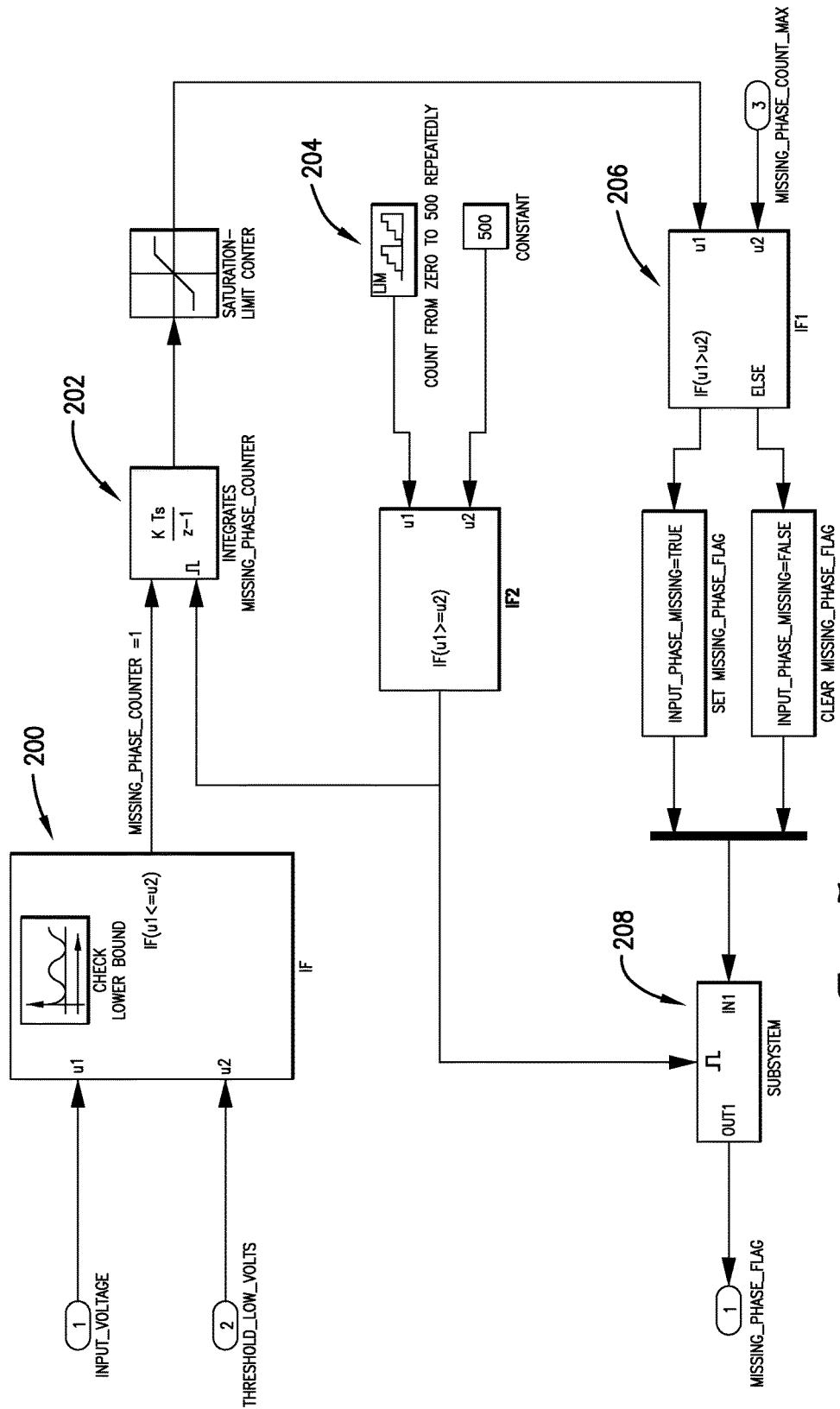
FIG. 7 is a flow diagram of steps performed in an implementation of the process of FIG. 6.

Referring to FIG. 7, one possible, non-limiting implementation of the functioning of the motor control subsystem 16 of FIG. 2 is shown in greater detail. Other implementations are possible, and the details of any such implementations of the motor system 10 of the present invention will largely depend on the requirements and functionalities of the system 10 and its various components. In operation, every approximately 2 milliseconds the sensed output voltage level is compared to the predetermined threshold voltage level, as shown in step 200. If the sensed output voltage level is below the predetermined threshold voltage level, then a counter signal is sent to increment a first counter, as shown in step 202. Simultaneously, a second counter counts from 0 to 500 in approximately 1 second (i.e., the second counter is automatically incremented every approximately 2 milliseconds), then resets to 0 and repeats, as shown in step 204. If the first counter does not reach a predetermined threshold number of detected low voltage levels before the second counter resets (i.e., within approximately 1 second), then the first counter also resets to 0 and the process repeats itself from the beginning. However, if the first counter reaches a predetermined threshold number of detected low voltage levels before the second counter resets, as shown in step 206, then a signal is sent indicating that a low or missing phase has been detected, as shown in step 208. Thus, in this implementation, the sensed output voltage level must be below the predetermined threshold voltage level for a particular period of time (which is controlled by the predetermined threshold number of detected low voltage levels) before the microprocessor 28 takes action, thereby ignoring single or short-term drops in the sensed output voltage level.

Any or all of these predetermined values, including the predetermined threshold voltage level, the frequency at which voltage levels are compared, the reset time, and the predetermined threshold number of detected low voltage levels, may be stored in one or more memories, such as electrically erasable read-only memories, that are accessible to the microprocessor 28.

Figure 8:
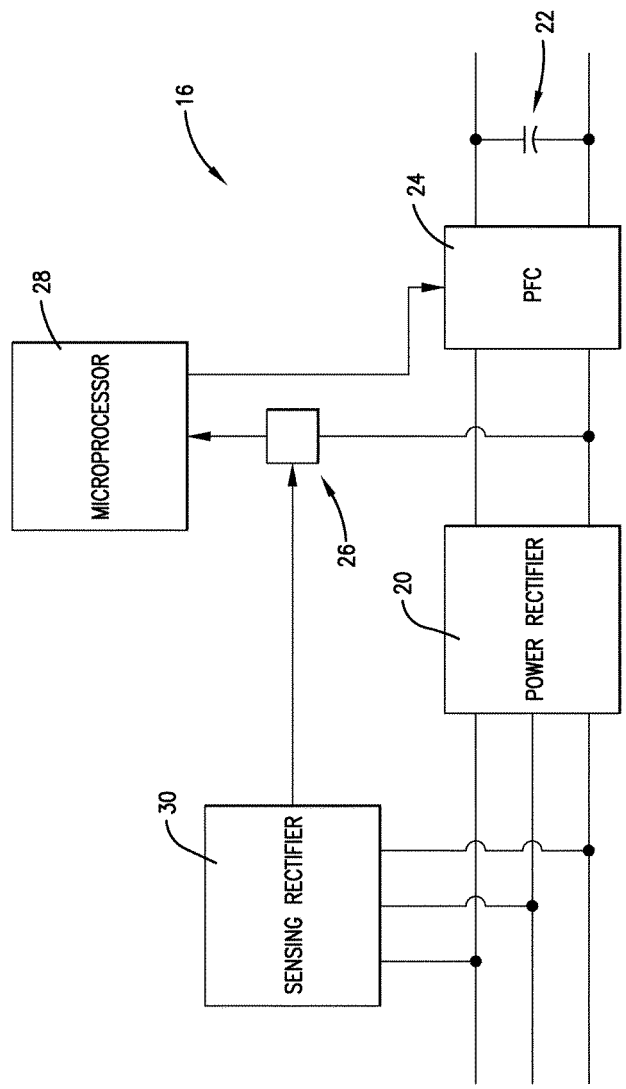
FIG. 8 is a block diagram of a second embodiment of the motor control subsystem of the electric motor system of FIG. 1.
Figure 9:
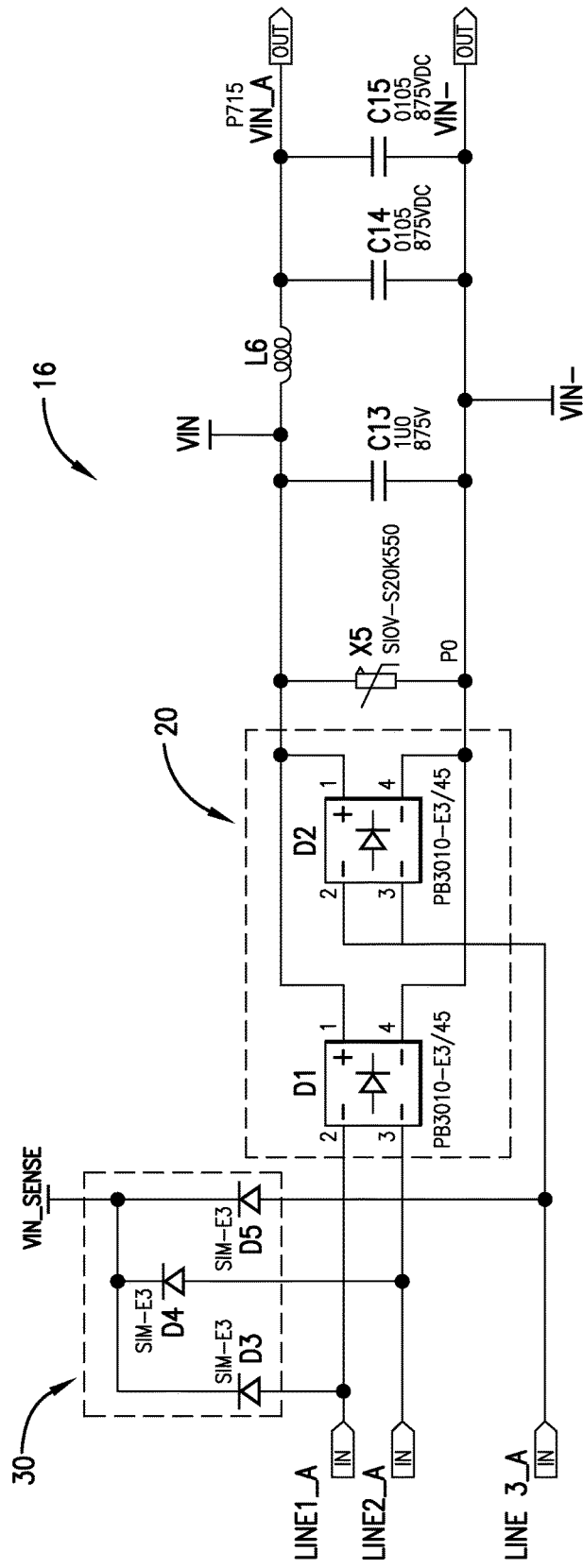
FIG. 9 is a schematic diagram of an implementation of a sensing power rectifier circuit of the motor control subsystem of FIG. 8.

Referring to FIG. 8, in a second embodiment the motor control subsystem 16 may include the power rectifier 20; the capacitor 22; the PFC circuit 24; the sensing circuit 26; the microprocessor 28, and a sensing rectifier 30. The sensing rectifier 30 is electrically connected before and in parallel with the power rectifier 20 and may be similarly operable to receive three-phase AC power from the power source 14 and convert it to DC power. Referring to FIG. 9, one possible, non-limiting implementation of the sensing rectifier 30 of FIG. 8 is shown in greater detail. Other implementations are possible, and the details of any such implementations of the motor system 10 of the present invention will largely depend on the requirements and functionalities of the system 10 and its various components. In this second embodiment, the sensing circuit 26 receives the output voltage signal of the sensing rectifier 30, whereas in the first embodiment, the sensing circuit 26 receives the output voltage signal of the power rectifier 20. Thus, in the second embodiment, the sensed voltage is based on the input to the power rectifier 20 rather than its output. The second embodiment may be used when circuits and/or circuit components, such as the large smoothing capacitor 22, following the power rectifier 20 may interfere with sensing the troughs in the voltage signal output by the power rectifier 20. The sensing circuit 26 may still use substantially the same reference voltage as other control circuitry.

In various implementations of the second embodiment, the PFC circuit 24 may be eliminated, the PFC circuit 24 may take the form of a boost converter which converts lower voltage to higher voltage (this implementation may be used with, e.g., 230 Volt applications); and the PFC circuit 24 may take the form of a buck converter which converts higher voltage to lower voltage (this implementation may be used with, e.g., 460 Volt applications).

Figure 6:
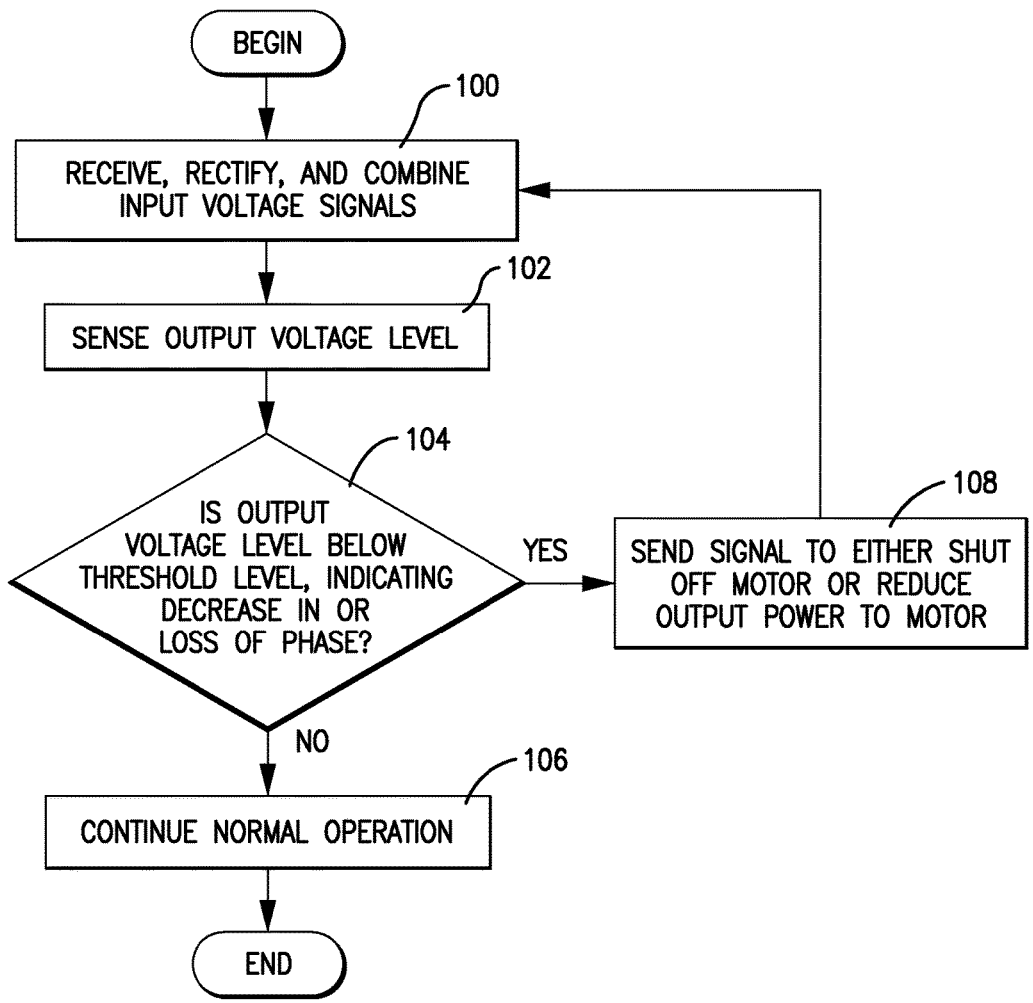
FIG. 6 is a flow diagram of process steps involved in the operation of the motor control subsystem of FIG. 2.

In operation, the second embodiment may operate substantially as shown in FIGS. 6 and 7, but with the sensing rectifier 30 rather than the power rectifier 20 performing step 100.

The present invention provides advantages over the prior art, including that it provides improved detection of and response to a decrease in or loss of an input voltage phase to a three-phase motor so that overloading, overheating, and other harmful effects can be avoided. In one implementation, the present invention accomplishes this with a less complex and less expensive single sensing circuit that does not require isolation or differential sensing.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. An electric motor system comprising:
   an electric motor; and
   a motor control subsystem including—
      a power rectifier configured to receive, rectify, and combine a plurality of spaced-apart sinusoidal input voltage phases to produce a first output voltage signal to power the electric motor, a power factor correction circuit electrically connected to the power rectifier so as to receive the first output voltage signal and configured to manage power flowing to the motor, a sensing rectifier electrically connected in parallel with the power rectifier and configured to receive, rectify, and combine the plurality of spaced-apart sinusoidal input voltage phases to produce a second output voltage signal, a sensing circuit electrically connected between the sensing rectifier and the power factor correction circuit and configured to sense a voltage level of the second output voltage signal, and a microprocessor in communication with the sensing circuit and the power factor correction circuit and configured to receive the sensed voltage level from the sensing circuit, compare the sensed voltage level to a predetermined threshold voltage level, which corresponds to a loss of one of the plurality of spaced-apart sinusoidal input voltage phases, and if the sensed voltage level is below the predetermined threshold voltage level, send a signal to the power factor correction circuit to limit an output power to the electric motor.

2. The electric motor system as set forth in claim 1, wherein the electric motor is a multiple-phase permanent magnet motor.

3. The electric motor system as set forth in claim 1, wherein the power factor correction circuit and the sensing circuit each use a single reference voltage.

4. The electric motor system as set forth in claim 1, wherein the predetermined threshold voltage level is adjustable.

5. The electric motor system as set forth in claim 1, wherein the signal sent by the microprocessor causes the electric motor to shut off.

6. A motor control system configured to control an electric motor, the motor control system comprising:
a power rectifier configured to receive, rectify, and combine three spaced-apart sinusoidal input voltage phases to produce a first output voltage signal to power the electric motor;
a smoothing capacitor;
a power factor correction circuit electrically connected between the power rectifier and the smoothing capacitor and configured to manage power flowing to the motor;
a sensing rectifier electrically connected in parallel with the power rectifier and configured to receive, rectify, and combine the plurality of spaced-apart sinusoidal input voltage phases to produce a second output voltage signal;
a sensing circuit electrically connected between the sensing rectifier and the power factor correction circuit and configured to sense a voltage level of the second output voltage signal at the point; and
a microprocessor in communication with the sensing circuit and the power factor correction circuit and configured to receive the sensed voltage level from the sensing circuit, compare the sensed voltage level to a predetermined threshold voltage level, which corresponds to a loss of one of the three spaced-apart sinusoidal input voltage phases, and if the sensed voltage level is below the predetermined threshold voltage level, send a signal to the power factor correction circuit to limit an output power to the electric motor.

7. The motor control system as set forth in claim 6, wherein the electric motor is a three-phase permanent magnet motor.

8. The motor control system as set forth in claim 6, wherein the power factor correction circuit and the sensing circuit each use a single voltage.

9. The motor control system as set forth in claim 6, wherein the predetermined threshold voltage level is adjustable.

10. The motor control system as set forth in claim 6, wherein the signal sent by the microprocessor causes the electric motor to shut off.

11. A motor control system configured to control an electric motor, the motor control subsystem comprising:
a power rectifier configured to receive, rectify, and combine three spaced-apart sinusoidal input voltage phases to produce a first output voltage signal to power the electric motor;
a smoothing capacitor;
a power factor correction circuit electrically connected between the power rectifier and the smoothing capacitor and configured to manage power flowing to the motor;
a sensing rectifier electrically connected in parallel with the power rectifier and configured to receive, rectify, and combine the plurality of spaced-apart sinusoidal input voltage phases to produce a second output voltage signal;
a sensing circuit electrically connected between the sensing rectifier and the power factor correction circuit and configured to sense a voltage level of the second output voltage signal at the point; and
a microprocessor in communication with the sensing circuit and the power factor correction circuit and configured to receive the sensed voltage level from the sensing circuit, compare the sensed voltage level to a predetermined threshold voltage level, which corresponds to a loss of one of the three spaced-apart sinusoidal input voltage phases, and if the sensed voltage level is below the predetermined threshold voltage level, send a signal to shut off the electric motor.

12. The motor control system as set forth in claim 11, wherein the electric motor is a three-phase permanent magnet motor.

13. The motor control system as set forth in claim 11, wherein the power factor correction circuit and the sensing circuit each use a single reference voltage.

14. The motor control system as set forth in claim 11, wherein the predetermined threshold voltage level is adjustable.

15. A method of controlling an electric motor, the method comprising:
(1) rectifying and combining three spaced-apart sinusoidal input voltage phases using a power rectifier, and producing a first output voltage signal to power the electric motor;
(2) managing a power flowing to the electric motor using a power correction factor circuit located between the power rectifier and a smoothing capacitor;
(3) rectifying and combining the three spaced-apart sinusoidal input voltage phases using a sensing rectifier electrically connected in parallel with the power rectifier, and producing a second output voltage signal;

(4) sensing a voltage level of the second output voltage signal using a sensing circuit electrically connected between the sensing rectifier and the power correction factor circuit;

(5) comparing the sensed voltage level of the output voltage signal to a predetermined threshold voltage level using a microprocessor, wherein the predetermined threshold voltage level corresponds to a loss of one of the three spaced-apart sinusoidal input voltage phases;

(6) repeating step (5) a predetermined number of times during a predetermined period of time; and (7) if the sensed voltage level is below the predetermined threshold voltage level for the predetermined number of times during the predetermined period of time, sending a signal from the microprocessor to limit the power flowing to the electric motor.

16. The method as set forth in claim 15, wherein the electric motor is a three-phase permanent magnet motor.

17. The method as set forth in claim 15, wherein the signal causes the electric motor to shut off.

* * * * *